United States Patent
Cook et al.

(10) Patent No.: US 10,970,133 B2
(45) Date of Patent: Apr. 6, 2021

(54) SYSTEM AND METHOD FOR HARDWARE ACCELERATION FOR OPERATOR PARALLELIZATION WITH STREAMS

(71) Applicant: INTERNATIONAL BUSINESS MACHINES CORPORATION, Armonk, NY (US)

(72) Inventors: Alexander Cook, Rochester, MN (US); Jonathan L. Kaus, Rochester, MN (US); David M. Koster, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 15/133,466

(22) Filed: Apr. 20, 2016

(65) Prior Publication Data

US 2017/0308504 A1 Oct. 26, 2017

(51) Int. Cl.
*G06F 9/54* (2006.01)
*G06F 9/50* (2006.01)

(52) U.S. Cl.
CPC ............... *G06F 9/54* (2013.01); *G06F 9/5083* (2013.01)

(58) Field of Classification Search
CPC ...... G06F 9/54; G06F 15/17318; G06F 15/80; G06F 9/5083
See application file for complete search history.

(56) References Cited

U.S. PATENT DOCUMENTS

| | | | | |
|---|---|---|---|---|
| 7,714,870 B2 * | 5/2010 | Lippincott | ............ | G06F 9/3879 345/502 |
| 2002/0112091 A1 * | 8/2002 | Schott | ............ | G06F 9/54 719/328 |
| 2003/0028661 A1 * | 2/2003 | Burger | ............ | H04L 12/6418 709/231 |
| 2004/0160960 A1 * | 8/2004 | Monta | ............ | H04N 21/23406 370/395.4 |
| 2008/0052429 A1 * | 2/2008 | Botchek | ............ | G06F 9/3879 710/62 |
| 2008/0244169 A1 | 10/2008 | Dawson et al. | | |
| 2010/0142516 A1 * | 6/2010 | Lawson | ............ | H04M 7/0021 370/352 |
| 2012/0030421 A1 | 2/2012 | Chang et al. | | |

(Continued)

FOREIGN PATENT DOCUMENTS

| | | |
|---|---|---|
| WO | 2002063421 A2 | 8/2002 |
| WO | 2006126090 A2 | 11/2006 |

(Continued)

OTHER PUBLICATIONS

IBM Patent Applications Listing for Patent Applications to Be Treated as Related, filed Mar. 13, 2017, pp. 1-2.
For Examiner's Eyes Only, Related U.S. Appl. No. 15/455,498, filed Mar. 10, 2017, System and Method For Batch Transport Using Hardware Accelerators, pp. 1-27.
Appendix P: IBM Patent Applications to Be Treated as Related, filed Apr. 20, 2016, pp. 1-2.

(Continued)

*Primary Examiner* — Theodore C Parsons
*Assistant Examiner* — Bruce S Ashley
(74) *Attorney, Agent, or Firm* — Caleb D. Wilkes

(57) ABSTRACT

A method, computer program product, and computer system for consolidating, at a computing device, a number of parallel streams, entering a hardware accelerator in a cluster, into fewer streams. The fewer streams, exiting the hardware accelerator in the cluster, may be returned back into the number of parallel streams.

18 Claims, 4 Drawing Sheets

(56) References Cited

U.S. PATENT DOCUMENTS

| | | |
|---|---|---|
| 2012/0204000 A1 | 8/2012 | Biran et al. |
| 2013/0111084 A1 | 5/2013 | Wang |
| 2013/0125127 A1 | 5/2013 | Mital et al. |
| 2013/0151747 A1* | 6/2013 | Zhang .................... G06F 9/505 710/310 |
| 2014/0026141 A1 | 1/2014 | Lippett |
| 2014/0105208 A1 | 4/2014 | Pope et al. |
| 2014/0344326 A1 | 11/2014 | Kamath et al. |
| 2014/0351551 A1 | 11/2014 | Doerr et al. |
| 2015/0100720 A1 | 4/2015 | Flynn et al. |
| 2015/0199214 A1* | 7/2015 | Lee ........................ G06F 9/505 718/102 |
| 2015/0347185 A1 | 12/2015 | Holt et al. |
| 2017/0195173 A1* | 7/2017 | Izenberg ............. G06F 9/45558 |

FOREIGN PATENT DOCUMENTS

| | | |
|---|---|---|
| WO | 2007044562 A1 | 4/2007 |
| WO | 2013192236 A1 | 12/2013 |

OTHER PUBLICATIONS

For Examiner's Eyes Only, Related U.S. Appl. No. 15/133,438, filed Apr. 20, 2016, System and Method For Batch Transport Using Hardware Accelerators, pp. 1-27.

Weber et al., "Comparing Hardware Accelerators in Scientific Applications: A Case Study," IEEE Transactions on Parallel and Distributed Systems, vol. 22, No. 1, Jan. 2011, pp. 58-68.

Chai et al. "Extending a Stream Programming Paradigm to Hardware Accelerator Platforms," Motorola General Business Information, pp. 1-34.

\* cited by examiner

SYSTEM AND METHOD FOR HARDWARE ACCELERATION FOR OPERATOR PARALLELIZATION WITH STREAMS

BACKGROUND

In certain environments (e.g., a distributed programming environment), the response times of the application, or the overall throughput that the environment may process, may be dictated by the slowest part of that distributed environment. For instance, with Streams programming, the overall operator graph may be slowed down by the weakest link. This weakest link may be evidenced by the "backpressure" that exists, which may be effectively the queue of tuples waiting to be processed one-by-one by an operator.

BRIEF SUMMARY OF DISCLOSURE

In one example implementation, a method, performed by one or more computing devices, may include but is not limited to consolidating, at a computing device, a number of parallel streams, entering a hardware accelerator in a cluster, into fewer streams. The fewer streams, exiting the hardware accelerator in the cluster, may be returned back into the number of parallel streams.

One or more of the following example features may be included. At least a portion of a number of available hardware accelerator blocks in a cluster may be identified. A size of one or more operators in one or more parallel streams that are capable of running on a hardware accelerator in the cluster may be identified. It may be determined whether at least a portion of the one or more operators are associated with a placement requirement for running on the hardware accelerator. At least the portion of the one or more operators may be placed based upon, at least in part, the placement requirements. The placement requirement may include an inability to run at least the portion of the one or more operators without the hardware accelerator. The placement requirement may include an ability to run at least the portion of the one or more operators on the hardware accelerator and an ability to run at least the portion of the one or more operators without the hardware accelerator. At least the portion of the one or more operators on the hardware accelerator may be rebalanced. The hardware accelerator may include a Field-Programmable Gate Array. An input API layer and an output API layer may be shared with the one or more parallel streams and the hardware accelerator. One or more tuples associated with the one or more operators may be tagged to identify which stream of the one or more parallel streams on which the one or more tuples were transported.

In another example implementation, a computing system may include one or more processors and one or more memories configured to perform operations that may include but are not limited to consolidating, at a computing device, a number of parallel streams, entering a hardware accelerator in a cluster, into fewer streams. The fewer streams, exiting the hardware accelerator in the cluster, may be returned back into the number of parallel streams.

One or more of the following example features may be included. At least a portion of a number of available hardware accelerator blocks in a cluster may be identified. A size of one or more operators in one or more parallel streams that are capable of running on a hardware accelerator in the cluster may be identified. It may be determined whether at least a portion of the one or more operators are associated with a placement requirement for running on the hardware accelerator. At least the portion of the one or more operators may be placed based upon, at least in part, the placement requirements. The placement requirement may include an inability to run at least the portion of the one or more operators without the hardware accelerator. The placement requirement may include an ability to run at least the portion of the one or more operators on the hardware accelerator and an ability to run at least the portion of the one or more operators without the hardware accelerator. At least the portion of the one or more operators on the hardware accelerator may be rebalanced. The hardware accelerator may include a Field-Programmable Gate Array. An input API layer and an output API layer may be shared with the one or more parallel streams and the hardware accelerator. One or more tuples associated with the one or more operators may be tagged to identify which stream of the one or more parallel streams on which the one or more tuples were transported.

In another example implementation, a computer program product may reside on a computer readable storage medium having a plurality of instructions stored thereon which, when executed across one or more processors, may cause at least a portion of the one or more processors to perform operations that may include but are not limited to consolidating, at a computing device, a number of parallel streams, entering a hardware accelerator in a cluster, into fewer streams. The fewer streams, exiting the hardware accelerator in the cluster, may be returned back into the number of parallel streams.

One or more of the following example features may be included. At least a portion of a number of available hardware accelerator blocks in a cluster may be identified. A size of one or more operators in one or more parallel streams that are capable of running on a hardware accelerator in the cluster may be identified. It may be determined whether at least a portion of the one or more operators are associated with a placement requirement for running on the hardware accelerator. At least the portion of the one or more operators may be placed based upon, at least in part, the placement requirements. The placement requirement may include an inability to run at least the portion of the one or more operators without the hardware accelerator. The placement requirement may include an ability to run at least the portion of the one or more operators on the hardware accelerator and an ability to run at least the portion of the one or more operators without the hardware accelerator. At least the portion of the one or more operators on the hardware accelerator may be rebalanced. The hardware accelerator may include a Field-Programmable Gate Array. An input API layer and an output API layer may be shared with the one or more parallel streams and the hardware accelerator. One or more tuples associated with the one or more operators may be tagged to identify which stream of the one or more parallel streams on which the one or more tuples were transported.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
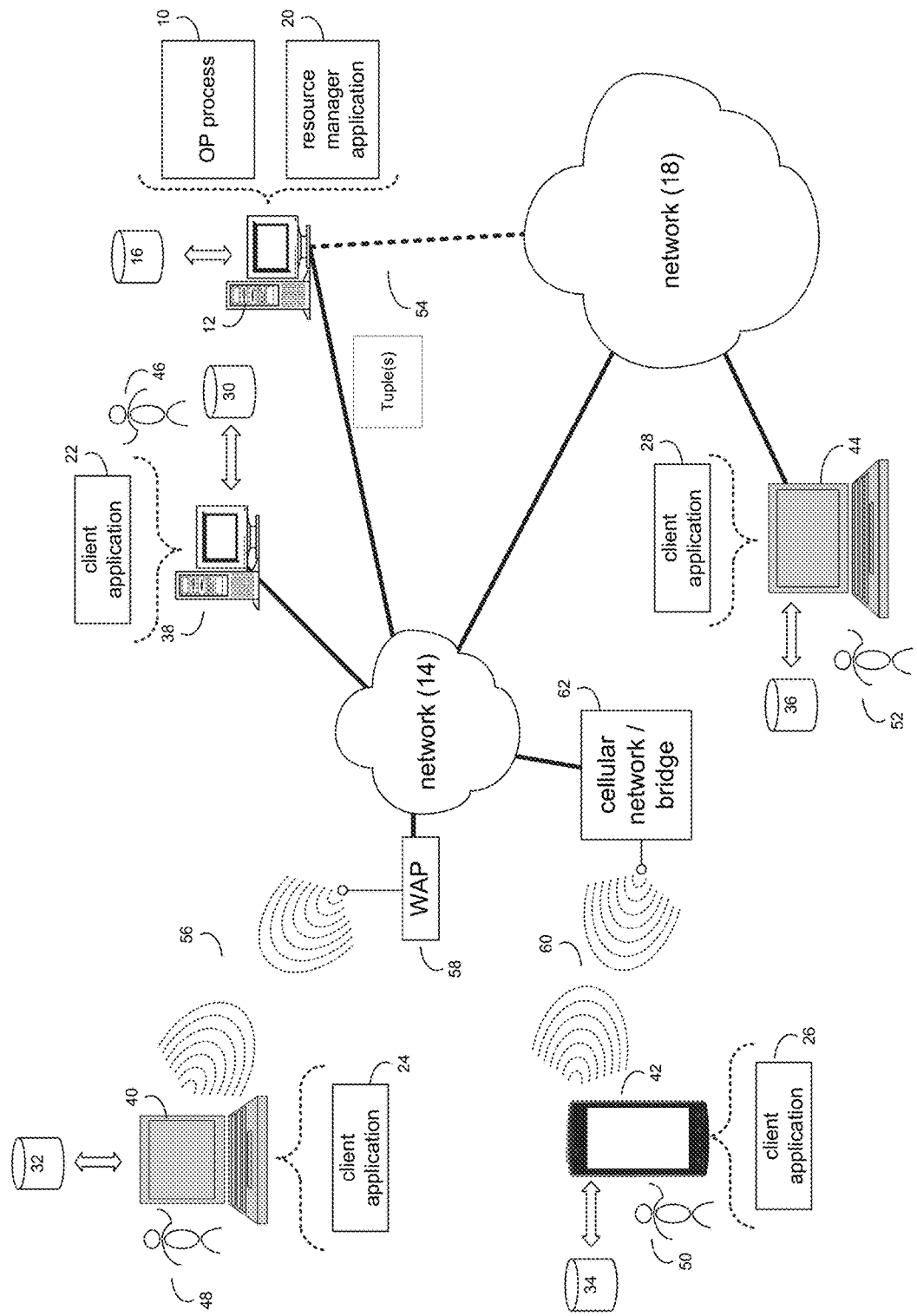
FIG. 1 is an example diagrammatic view of a batch transport process coupled to a distributed computing network according to one or more example implementations of the disclosure.

System Overview:

As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the example implementation of FIG. 1, there is shown Operator Parallelization (OP) process 10 that may reside on and may be executed by a computer (e.g., computer 12), which may be connected to a network (e.g., network 14) (e.g., the interne or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, OP process 10 may consolidate, at a computing device, a number of parallel streams, entering a hardware accelerator in a cluster, into fewer streams. The fewer streams, exiting the hardware accelerator in the cluster, may be returned back into the number of parallel streams.

In some implementations, the instruction sets and subroutines of OP process 10, which may be stored on storage device 16 coupled to computer 12, may be executed by one or more processors (not shown) and one or more memory architectures (not shown) included within computer 12.

Storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. Any data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. The data store may also be a custom database, such as, for example, a flat file database or an XML database. Any other form(s) of a data storage structure and/or organization may also be used. In some implementations, OP process 10 may be a component of the data store, a standalone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

In some implementations, Computer 12 may execute a resource manager application (e.g., resource manager application 20), examples of which may include, but are not limited to, e.g., any application that allows for allocation (and/or temporary allocation loaning) and/or requesting back of machines (and their resources, such as, e.g., primary memory and secondary memory, processor(s), bandwidth, graphics and sound, networks, cache, etc.) at each of the Map and Reduce steps (or otherwise) to attempt to alleviate stresses placed on a subset of the computing cluster. OP process 10 and/or resource manager application 20 may be accessed via client applications 22, 24, 26, 28. OP process 10 may be a standalone application, or may be an applet/application/script/extension that may interact with and/or be executed within resource manager application 20, a component of resource manager application 20, and/or one or more of client applications 22, 24, 26, 28. Resource manager application 20 may be a standalone application, or may be an applet/application/script/extension that may interact with and/or be executed within OP process 10, a component of OP process 10, and/or one or more of client applications 22, 24, 26, 28. One or more of client applications 22, 24, 26, 28 may be a standalone application, or may be an applet/application/script/extension that may interact with and/or be executed within and/or be a component of OP process 10 and/or resource manager application 20. Examples of client applications 22, 24, 26, 28 may include, but are not limited to, e.g., any application that allows for allocation (and/or temporary allocation loaning) and/or requesting back of machines (and their resources, such as, e.g., primary memory and secondary memory, processor(s), bandwidth, graphics and sound, networks, cache, etc.) at each of the Map and Reduce steps (or otherwise) to attempt to alleviate stresses placed on a subset of the computing cluster, a standard and/or mobile web browser, an email application (e.g., an email client application), a textual and/or a graphical user interface, a customized web browser, a plugin, an Application Programming Interface (API), a streaming application platform, or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of OP process 10 (and vice versa). Accordingly, OP process 10 may be a purely server-side application, a purely client-side application, or a hybrid server-side/client-side application that is cooperatively executed by one or more of client applications 22, 24, 26, 28 and/or OP process 10.

One or more of client applications 22, 24, 26, 28 may be configured to effectuate some or all of the functionality of resource manager application 20 (and vice versa). Accordingly, resource manager application 20 may be a purely server-side application, a purely client-side application, or a hybrid server-side/client-side application that is cooperatively executed by one or more of client applications 22, 24, 26, 28 and/or resource manager application 20. As one or more of client applications 22, 24, 26, 28, OP process 10, and resource manager application 20, taken singly or in any combination, may effectuate some or all of the same functionality, any description of effectuating such functionality via one or more of client applications 22, 24, 26, 28, OP process 10, resource manager application 20, or combination thereof, and any described interaction(s) between one or more of client applications 22, 24, 26, 28, OP process 10, resource manager application 20, or combination thereof to effectuate such functionality, should be taken as an example only and not to limit the scope of the disclosure.

Users 46, 48, 50, 52 may access computer 12 and OP process 10 (e.g., using one or more of client electronic devices 38, 40, 42, 44) directly through network 14 or through secondary network 18. Further, computer 12 may be connected to network 14 through secondary network 18, as illustrated with phantom link line 54. OP process 10 may include one or more user interfaces, such as browsers and textual or graphical user interfaces, through which users 46, 48, 50, 52 may access OP process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection.

Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
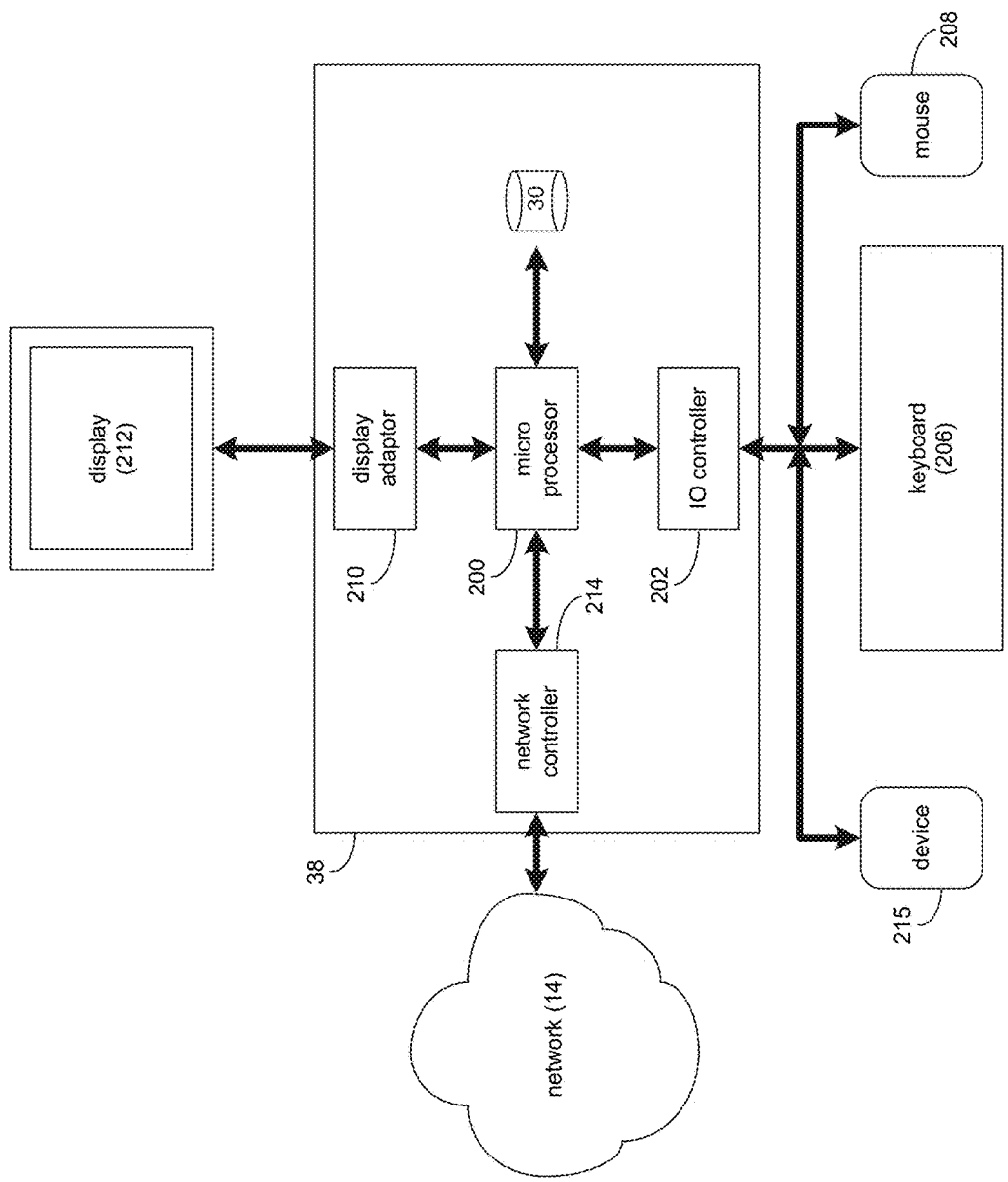
FIG. 2 is an example diagrammatic view of a client electronic device of FIG. 1 according to one or more example implementations of the disclosure.

Referring also to FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, OP process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed in greater detail, hardware acceleration may be a powerful tool. Generally, in Stream Computing, the parallelizable portions of the application may be marked in order to exploit as much of the hardware available as possible, to achieve fast throughput. Several products exist in the stream computing space namely IBM's InfoSphere Streams. Generally, in InfoSphere Streams, a user may set the level of parallelization for a parallel region (e.g., for a level of 5, data may be processed in 5 parallel regions). Each processing element may have its own process. Following this same approach, parallel regions with operators that contain hardware acceleration code may each take up separate sections of programmable logic blocks within an FPGA (or other programmable hardware).

In certain environments (e.g., a distributed programming environment), the response times of the application, or the overall throughput that the environment may process, may be dictated by the slowest part of that distributed environment. For instance, with Streams programming, the overall operator graph may be slowed down by the weakest link. This weakest link may be evidenced by the "backpressure" that exists, which may be effectively the queue of tuples waiting to be processed one-by-one by an operator. Typically, a technique to deal with the "weakest link" may be to increase the number of parallel regions in that area to improve the overall throughput of the application. Realistically, the number of processes available for parallelization is infinite, but the availability of programmable logic blocks is not. Generally, parallelization may be executed by acquiring additional logical resources and deploying identical code on those resources; however, this technique may not consider or attempt to parallelize within any given resource (such as an FPGA). Thus, as will be discussed in greater detail below, the present disclosure may involve, e.g., the intelligent layout of parallel programs onto a limited number of programmable logic blocks, and may involve, e.g., handling parallelization of streaming graph regions that contain sections that require, or are capable of exploiting, an FPGA.

Figure 3:
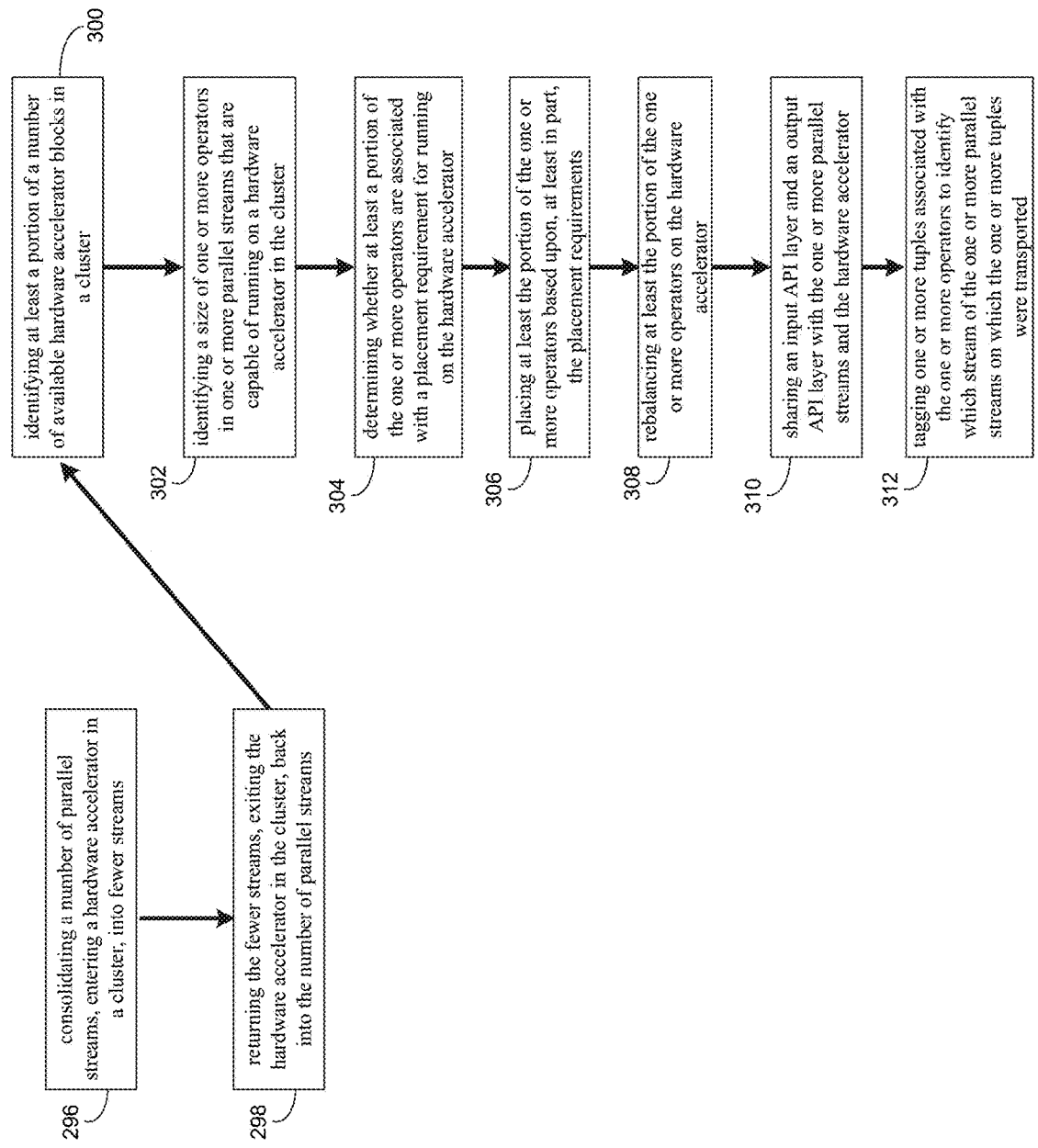
FIG. 3 is an example flowchart of the batch transport process of FIG. 1 according to one or more example implementations of the disclosure.
Figure 4:
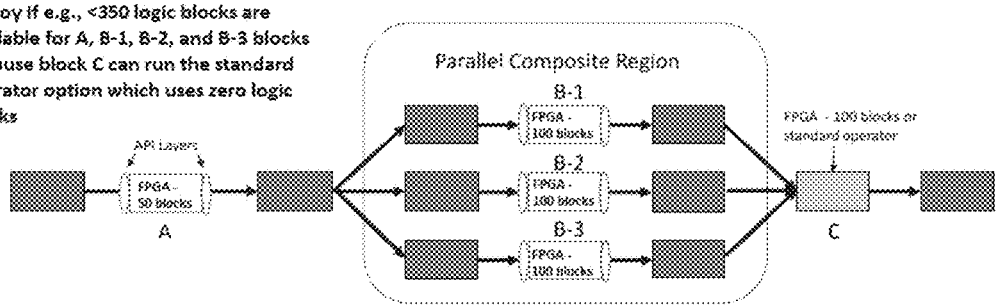
FIG. 4 is an example environment 400 according to one or more example implementations of the disclosure.
Figure 4:
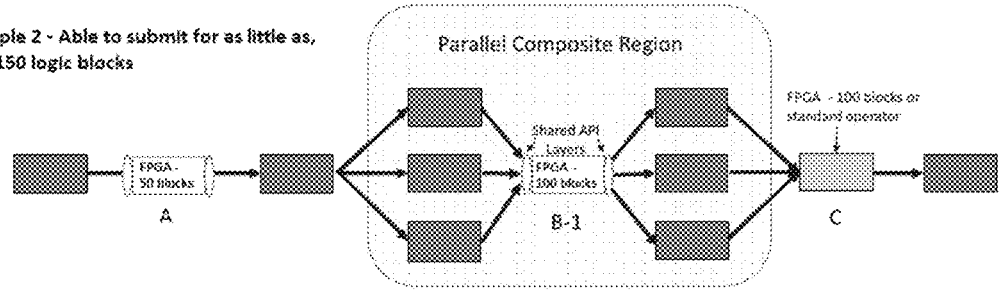

The OP Process:

As discussed above and referring also at least to the example implementations of FIGS. 3-4, Operator Parallelization (OP) process 10 may consolidate 296, at a computing device, a number of parallel streams, entering a hardware accelerator in a cluster, into fewer streams. OP process 10 may return 298 the fewer streams exiting the hardware accelerator in the cluster, back into the number of parallel streams.

In some implementations, the hardware accelerator may include a Field-Programmable Gate Array. It will be appreciated that other types of hardware accelerators may be used without departing from the scope of the disclosure. As such, the description of using a Field-Programmable Gate Array (FPGA) should be taken as example only and not to otherwise limit the scope of the disclosure.

For instance, and referring at least to FIG. 4, an example environment 400 is shown. Assume for example purposes only that there are 350 hardware accelerator (e.g., FPGA) programmable logic blocks available in the cluster (e.g., a stream cluster). Thus, in the example (e.g., Example 1), the minimum number of FPGA programmable logic blocks required for deploying this sample may be 350 (i.e., 100@ B-1+100 @ B-2+100 @ B-3+50 @ A). Further assume for the example that there is an application with up to 450 programmable logic blocks worth of operators to be processed via a plurality of parallel streams (e.g., a 100 block operator parallelized 3 ways, a 50 block operator, and a flexible operator that may be 100 blocks or may run as a standard process). Thus, in the example, there are more FPGA programmable logic blocks worth of operators (e.g., 450) than available FPGA programmable logic blocks to use for those operators (e.g., 350).

In some implementations, to provide the ability to handle parallel streams that require more logic blocks than are available, OP process 10 may consolidate 296 a number of parallel streams, entering a hardware accelerator in a cluster, into fewer streams. For instance, comparing only the Parallel Composite Region of Example 1 and Example 2 from FIG. 4, it may be seen that there are 300 (i.e., 100 @ B-1+100 @ B-2+100 @ B-3) available FPGA programmable logic blocks for Example 1 and 100 (i.e., 100 @ B-1) available FPGA programmable logic blocks for Example 2. In the example, the three parallel streams from Example 1 (e.g., entering B-1, B-2, and B-3) may be consolidated 296 into fewer streams shown in Example 2 (e.g., entering B-1). Thus, in Example 1 there were 300 required FPGA programmable logic blocks (just for the Parallel Composite Region) and 350 total required FPGA programmable logic blocks to deploy the 450 FPGA programmable logic blocks worth of operators, which has been reduced in Example 2 to 100 required FPGA programmable logic blocks (just for the Parallel Composite Region) and 150 total required FPGA programmable logic blocks to deploy the 450 FPGA programmable logic blocks worth of operators. The above may enable OP process 10 to deploy an arbitrary number of logical streams to any FPGA, and allow the hardware (e.g., via OP process 10) to map that appropriately to the number of physical streams available. OP process 10 may then abstract the developer away from the requirement of understanding the hardware acceleration available on the machines within the distributed environment. For instance, OP process 10 may abstract out from the application developer that their streams are getting consolidated 296 into one stream and, as will be discussed below, then returned to the same streams. The above may also enable OP process 10 to reuse sets of programmable logic blocks for the FPGA sections of parallel regions in a streaming graph. For example, if a parallel region of a streams graph containing a section that runs on an FPGA is parallelized at a width of 10, but there is only room for 5 of those sections, then each section may have 2 streams flowing through it.

In some implementations, OP process 10 may share 310 an input API layer and an output API layer with the one or more parallel streams and the hardware accelerator and OP process 10 may tag 312 one or more tuples associated with the one or more operators to identify which stream of the one or more parallel streams on which the one or more tuples were transported. For instance, OP process 10 may share 310 an API layer between parallel streams that may be using the same section of FPGA programmable logic blocks. Assume for example purposes only that there are multiple parallel streams (e.g., three) that utilize a single section of FPGA programmable logic blocks (e.g., B-1). In the example, OP process 10 may select parallel streams to utilize the same section of programmable logic blocks that may share a single API layer with the FPGA for input, and a single API layer for output. For instance, all three streams from the "Parallel Composite Region" may pass through this single copy of the B Operator in Example 2, and as such, the streams share 310 an input application API layer and an output Application API layer.

In some implementations, OP process 10 may return 298 the fewer streams, exiting the hardware accelerator in the cluster, back into the number of parallel streams. For example, in Example 1 there were originally three parallel streams entering three FPGAs (e.g., B-1, B-2, and B-3), and those same three parallel streams exited their respective FPGA. In Example 2, the three parallel streams entering a single FPGA (e.g., B-1) were consolidated 396 into a single stream. After being processed by the FPGA (in Example 2), OP process 10 may return 298 the single consolidated 296 stream back to the original three parallel streams exiting the FPGA (e.g., B-1). In some implementations, the input API layer (e.g., via OP process 10) may take each tuple of data and append/tag 312 an attribute that identifies which parallel stream it was from (e.g., stream 1, stream 2, stream 3) to accurately return 298 the consolidated 296 stream back into the original three parallel streams. The input API layer (e.g., via OP process 10) may forward the messages to the FPGA, effectively abstracting out the parallelism. The FPGA (e.g., via OP process 10) may process the tuples as they arrive, then emit them to the output API layer. The output API layer (e.g., via OP process 10) may route the tuples back to their correct parallel stream using the stream identifying attribute. In some implementations, OP process 10 may remove this attribute once it is returned 298 to its stream (indicated by the attribute).

In some implementations, Operator Parallelization (OP) process 10 may identify 300, at a computing device (e.g., computer 12), at least a portion of a number of available hardware accelerator blocks in a cluster. In some implementations, resource manager application 20 (e.g., via OP process 10) may keep track of the availability of FPGAs on the hosts to which a given Streams application may be deployed. Assume for example purposes only that there are 150 hardware accelerator (e.g., FPGA) programmable logic blocks available in the cluster (e.g., a stream cluster). Thus, in the example (e.g., Example 2), the minimum number of FPGA programmable logic blocks required for deploying this sample may be 150 (i.e., 100 @ B-1+50 @ A). In the example, OP process 10 (e.g., via resource manager application 20) may identify 300 at least a portion of those FPGA programmable logic blocks as being available between at least a portion of the FPGAs in the stream cluster. It will be appreciated that the number of FPGA programmable logic blocks worth of operators may vary, and that the specific breakdown of those FPGA programmable logic blocks may vary without departing from the scope of the disclosure.

In some implementations, OP process 10 may identify 302 a size of one or more operators in one or more parallel streams that are capable of running on a hardware accelerator in the cluster. For instance, OP process 10 may identify 302 the sizes of the FPGA programmable logic block sections needed for each section of the streams graph that may be placed on one or more of the available FPGA's. Put another way, OP process 10 may identify 302 the sizes of operators that must, or potentially can run on an FPGA. In some implementations, the size of an operator may be known from compile metadata when the operator is compiled (e.g., via OP process 10) for FPGA deployment. Assume for example purposes only, as noted above, that there are 100 block operator parallelized 3 ways, a 50 block operator, and a flexible operator that can be 100 blocks or run as a standard process, resulting in 450 (i.e., 3×100+50+ 100 (optional)→450) FPGA programmable logic blocks that are at least capable of running on one or more of the FPGAs identified 300 as available in the streams cluster.

In some implementations, OP process 10 may determine 304 whether at least a portion of the one or more operators are associated with a placement requirement for running on the hardware accelerator. For instance, if there is room for all sections of the streams graph, OP process 10 may be able to place all of them in the FPGAs. For example, as noted above, OP process 10 identified 300 150 FPGA programmable logic blocks available in the stream cluster as the minimum number of FPGA programmable logic blocks required for deploying this sample. If OP process 10 had identified 302 the sizes of the FPGA programmable logic block sections needed for each section of the streams graph that may be placed on one or more of the available FPGA's to be 150 or less FPGA programmable logic blocks, OP process 10 may be able to place all of those 150 or less FPGA programmable logic blocks in the available 150 programmable logic blocks of the FPGAs.

However, in the above example, OP process 10 had identified 302 the sizes of the FPGA programmable logic block sections for each section of the streams graph that may be placed on one or more of the available FPGA's to be 450 FPGA programmable logic blocks. In the example, there is not enough room to place all of these operators, so OP process 10 may only be able to place 150 of those 450 FPGA programmable logic blocks in the available FPGAs.

To help determine which FPGA programmable logic blocks are to be placed in the available FPGA's and which FPGA programmable logic blocks are not, OP process 10 may determine 304 whether any of the operators associated with the 450 FPGA programmable logic blocks have any requirements on their placement for running on the hardware accelerator. In some implementations, certain operators may have been developed so that they can either run on a hardware accelerator, or run as a normal process without a hardware accelerator. In some implementations, this may involve developers effectively writing two sets of code for the same operator (e.g., one for a hardware accelerator and one as a normal process), only having one of the sets being used depending on their respective placement on or off the hardware accelerator. In some implementations, operators (such as Streams Programming Language (SPL) operators) may have definitions defined in their code (e.g., XML), where the FPGA placement requirement may be an XML attribute in the operator, e.g.: "required", "optional", "no FPGA capability". In some implementations, during job submission, OP process 10 may identify that attribute to determine 304 whether any of the operators associated with the 450 FPGA programmable logic blocks have any requirements on their placement for running on the hardware accelerator.

In some implementations, the placement requirement may include an inability to run at least the portion of the one or more operators without the hardware accelerator. For example, if an operator associated with the 450 FPGA programmable logic blocks cannot be run without the FPGA, that operator may have a placement requirement to be run via the 150 FPGA programmable logic blocks in the available FPGAs. In some implementations, the placement requirement may include an ability to run at least the portion of the one or more operators on the hardware accelerator and an ability to run at least the portion of the one or more operators without the hardware accelerator. For example, if an operator associated with the 450 FPGA programmable logic blocks is capable of running on an FPGA, but is also capable of running as a standard process (e.g., without using an FPGA), that operator may have a placement requirement to be run via the 150 FPGA programmable logic blocks in the available FPGAs (if there is enough space available), and may have a placement requirement to be run as a standard process without using an FPGA (e.g., if there is not enough space).

In some implementations, OP process 10 may place 306 at least the portion of the one or more operators based upon, at least in part, the placement requirements. In some implementations, the placement 306 may be accomplished in a particular priority order. For example, OP process 10 may first place 306 operator sections that are required to be placed on the FPGA. Continuing with the above example, OP process 10 may first place 306 Operator A with 50 FPGA programmable logic blocks because it can only run on an FPGA. Alternatively, OP process 10 may first place 306 one instance of B with 100 FPGA programmable logic blocks because it can only run on an FPGA (the 2 "extra" copies from the parallel region may be ignored for now for simplicity purposes). In some implementations, if the required piece of operator code is in a parallel region, OP process 10 may only require that at least one section of FPGA programmable logic blocks are dedicated to it.

After placement of the FPGA programmable logic blocks that are required to be run on a FPGA, OP process 10 may place operator sections that are flexible to run on or off a FPGA. For instance, sections of the streams graph that may be tagged as "ideal for hardware acceleration" but are not required to be run on an FPGA may be placed after the placement of the FPGA programmable logic blocks that are required to be run on a FPGA. For example, assuming enough space is still available after placing Operator A and Operator B, OP process 10 may place 306 Operator C with 100 FPGA programmable logic blocks on the FPGA since it has the capability to do so.

After placement of the FPGA programmable logic blocks that are required to be run on a FPGA, and after placement of the sections that are flexible to run on or off a FPGA, OP process 10 may attempt to place operators from other sections of the streams graph, including the redundant sections that may have fallen into the FPGA "required" and FPGA "capable" categories, but are in a parallel region. For instance, OP process 10 may attempt to add the 2 parallel copies of Operator B, but there may not be any more available FPGA programmable logic blocks.

In some implementations, at least the portion of the one or more operators on the hardware accelerator may be rebalanced 308 by OP process 10. For example, OP process 10 may rebalance 308 placement on one or more of the FPGAs to improve the performance in the "weakest link" areas. For instance, rebalancing 308 may allow for parts of the streams graph that are "weak links" to be prioritized for utilizing their full parallelization within the FPGA, while parts of the streams graph that may be performing very well may be consolidated 296 into fewer parallel regions within the FPGA.

An example of rebalancing 308 may be shown via Example 2 in FIG. 4. In the example, an application may start successfully as shown in the bottom diagram. Assume for example purposes only that after a period of time, e.g., 30 minutes of processing, OP process 10 may observe that Operator B is the slowest part of the streams graph and is slowing processing, while Operator C is easily keeping up. In the example, OP process 10 may start Operator C as a process, and replace the 100 FPGA programmable logic blocks it was occupying with another copy of Operator B. OP process 10 may divert one of the 3 parallel streams going to B-1 to this new copy, B-2. In the example, the heaviest load may be carried by B-1, while Operator C may have a very small load. In the example, OP process 10 may rebalance 308 how the load is spread over the FPGA by adding another copy of Operator B into the FPGA and moving Operator C out to being a normal process not run on the FPGA. This rebalances 308 the load that was at B-1 over B-1 and B-2, and moves the small load at Operator C to the process level.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
consolidating, at a computing device, a number of parallel streams, entering a hardware accelerator in a cluster, into fewer streams, wherein the hardware accelerator includes at least one Field-Programmable Gate Array (FPGA) processing the number of parallel streams;
deploying an arbitrary number of logical streams to the at least one FPGA, wherein deploying includes mapping the arbitrary number of logical streams to a number of physical streams;
returning the fewer streams, exiting the hardware accelerator in the cluster, back into the number of parallel streams;
identifying at least a portion of a number of available hardware accelerator blocks in the cluster;
identifying a size of operators in the plurality of parallel streams that are capable of running on a hardware accelerator in the cluster, wherein the operators comprise an FPGA optional attribute and further comprise at least one of an FPGA required attribute and a no FPGA capability attribute;
determining whether the operators are associated with a placement requirement for running on the at least one FPGA of the hardware accelerator, wherein the determining comprises identifying the FPGA optional attribute and the at least one of the FPGA required attribute and the no FPGA capability attribute; and
placing the operators based upon, at least in part, the placement requirement, wherein placement is accomplished based upon, at least in part, a priority order, wherein the priority order comprises a highest priority placement for any operator having an FPGA required attribute and a subsequent placement for an operator having the FPGA optional attribute and for any operator having the no FPGA capability attribute.

2. The computer-implemented method of claim 1 further comprising rebalancing at least a portion of the operators.

3. The computer-implemented method of claim 1 further comprising sharing an input Application Programming Interface (API) layer and an output API layer with the parallel streams and the hardware accelerator.

4. The computer-implemented method of claim 3 further comprising tagging one or more tuples associated with the operators to identify which stream of the parallel streams on which the one or more tuples were transported.

5. The computer-implemented method of claim 1 wherein two sets of code are provided for a common operator of the operators, wherein the two sets of code include a first set of code for the hardware accelerator and a second set of code for a normal process, and wherein at least one of the two sets of code is used based upon their respective placement on the hardware accelerator.

6. The computer-implemented method of claim 2, further comprising evaluating streaming performance of the fewer streams to determine a first operator of the operators having a highest streaming performance and a second operator,
wherein the rebalancing comprises:
shifting the first operator off of the FPGA, and
on the FPGA replacing the first operator with the second operator.

7. A computer program product residing on a non-transitory computer readable storage medium having a plurality of instructions stored thereon which, when executed across one or more processors, causes at least a portion of the one or more processors to perform operations comprising:
consolidating a number of parallel streams, entering a hardware accelerator in a cluster, into fewer streams, wherein the hardware accelerator includes at least one Field-Programmable Gate Array (FPGA) processing the number of parallel streams;
deploying an arbitrary number of logical streams to the at least one FPGA, wherein
deploying includes mapping the arbitrary number of logical streams to a number of physical streams;
returning the fewer streams, exiting the hardware accelerator in the cluster, back into the number of parallel streams;
identifying at least a portion of a number of available hardware accelerator blocks in the cluster;
identifying a size of operators in the plurality of parallel streams that are capable of running on a hardware accelerator in the cluster, wherein the operators comprise an FPGA optional attribute and further comprise at least one of an FPGA required attribute and a no FPGA capability attribute;
determining whether the operators are associated with a placement requirement for running on the at least one FPGA of the hardware accelerator, wherein the determining comprises identifying the FPGA optional attribute and the at least one of the FPGA required attribute and the no FPGA capability attribute; and
placing the operators based upon, at least in part, the placement requirement, wherein placement is accomplished based upon, at least in part, a priority order, wherein the priority order comprises a highest priority placement for any operator having an FPGA required attribute and a subsequent placement for an operator having the FPGA optional attribute and for any operator having the no FPGA capability attribute.

8. The computer program product of claim 7, wherein the operations further comprise rebalancing at least a portion of the operators.

9. The computer program product of claim 7, wherein the operations further comprise sharing an input Application Programming Interface (API) layer and an output API layer with the parallel streams and the hardware accelerator.

10. The computer program product of claim 9, wherein the operations further comprise tagging one or more tuples associated with the operators to identify which stream of the parallel streams on which the one or more tuples were transported.

11. The computer program product of claim 7 wherein two sets of code are provided for a common operator of the operators, wherein the two sets of code include a first set of code for the hardware accelerator and a second set of code for a normal process, and wherein at least one of the two sets of code is used based upon their respective placement on the hardware accelerator.

12. The computer program product of claim 8, wherein the operations further comprise evaluating streaming performance of the fewer streams to determine a first operator of the operators having a highest streaming performance and a second operator, and
wherein the rebalancing comprises:
shifting the first operator off of the FPGA, and
on the FPGA replacing the first operator with the second operator.

13. A computing system including one or more processors and one or more memories configured to perform operations comprising:
consolidating a number of parallel streams, entering a hardware accelerator in a cluster, into fewer streams, wherein the hardware accelerator includes at least one Field-Programmable Gate Array (FPGA) processing the number of parallel streams;
deploying an arbitrary number of logical streams to the at least one FPGA, wherein deploying includes mapping the arbitrary number of logical streams to a number of physical streams;
returning the fewer streams, exiting the hardware accelerator in the cluster, back into the number of parallel streams;
identifying at least a portion of a number of available hardware accelerator blocks in the cluster;
identifying a size of operators in the plurality of parallel streams that are capable of running on a hardware accelerator in the cluster;
determining whether the operators are associated with a placement requirement for running on the at least one FPGA of the hardware accelerator, wherein the determining comprises identifying the FPGA optional attribute and the at least one of the FPGA required attribute and the no FPGA capability attribute; and
placing the operators based upon, at least in part, the placement requirement, wherein placement is accomplished based upon, at least in part, a priority order, wherein the priority order comprises a highest priority placement for any operator having an FPGA required attribute and a subsequent placement for an operator having the FPGA optional attribute and for any operator having the no FPGA capability attribute.

14. The computing system of claim 13, wherein the operations further comprise rebalancing at least the portion of the operators.

15. The computing system of claim 13, wherein the operations further comprise sharing an input Application Programming Interface (API) layer and an output API layer with the parallel streams and the hardware accelerator.

16. The computing system of claim 15, wherein the operations further comprise tagging one or more tuples associated with the operators to identify which stream of the parallel streams on which the one or more tuples were transported.

17. The computing system of claim 13 wherein two sets of code are provided for a common operator of the one or more operators, wherein the two sets of code include a first set of code for the hardware accelerator and a second set of code for a normal process, and wherein at least one of the two sets of code is used based upon their respective placement on the hardware accelerator.

18. The computer system of claim 14, wherein the operations further comprise evaluating streaming performance of the fewer streams to determine a first operator of the operators having a highest streaming performance and a second operator, and wherein the rebalancing comprises:
shifting the first operator off of the FPGA, and
on the FPGA replacing the first operator with the second operator.

* * * * *